United States Patent
Bergweiler

(10) Patent No.: US 12,485,925 B2
(45) Date of Patent: Dec. 2, 2025

(54) DRIVING ASSISTANCE SYSTEM AND DRIVING ASSISTANCE METHOD FOR A VEHICLE INCLUDING A PLAUSIBILITY CHECK BY A CONTROL UNIT ON INFORMATION FROM ANOTHER CONTROL UNIT

(71) Applicant: Bayerische Motoren Werke Aktiengesellschaft, Munich (DE)

(72) Inventor: Tobias Bergweiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 240 days.

(21) Appl. No.: 18/018,644

(22) PCT Filed: Jul. 27, 2021

(86) PCT No.: PCT/EP2021/070933
§ 371 (c)(1),
(2) Date: Jan. 30, 2023

(87) PCT Pub. No.: WO2022/023306
PCT Pub. Date: Feb. 3, 2022

(65) Prior Publication Data
US 2024/0034359 A1 Feb. 1, 2024

(30) Foreign Application Priority Data
Jul. 31, 2020 (DE) ............ 10 2020 120 301.2

(51) Int. Cl.
*B60W 60/00* (2020.01)
*B60W 50/02* (2012.01)

(52) U.S. Cl.
CPC .... *B60W 60/0018* (2020.02); *B60W 50/0205* (2013.01); *B60W 2050/021* (2013.01); *B60W 2520/04* (2013.01)

(58) Field of Classification Search
CPC ...... G07C 5/008; G07C 5/0808; G07C 5/085; G01C 22/02
See application file for complete search history.

(56) References Cited

U.S. PATENT DOCUMENTS 9,874,609 B2 * 1/2018 Rasbornig .......... G01R 31/3187
10,145,882 B2 * 12/2018 Rasbornig ............... B60T 8/885
(Continued)

FOREIGN PATENT DOCUMENTS

DE 10 2010 021 591 A1 12/2011
DE 10 2013 003 216 A1 9/2013
(Continued)

OTHER PUBLICATIONS

International Search Report (PCT/ISA/210) issued in PCT Application No. PCT/EP2021/070933 dated Nov. 11, 2021 with English translation (five (5) pages).
(Continued)

*Primary Examiner* — Ramsey Refai
(74) *Attorney, Agent, or Firm* — Crowell & Moring LLP

(57) ABSTRACT

A driving assistance system for a vehicle includes a first control unit and a second control unit, the second control unit configured to receive instructions from the first control unit to carry out an action, and at least one first sensor unit assigned to the first control unit. The second control unit is configured to carry out the action and to transmit information relating to the carrying out of the action to the first control unit. The first control unit is configured to check the plausibility of the information received from the second control unit on the basis of sensor data of the at least one first sensor unit.

17 Claims, 3 Drawing Sheets

(56) References Cited

U.S. PATENT DOCUMENTS

| | | | |
|---|---|---|---|
| 2007/0282459 A1* | 12/2007 | Schafer | G05B 9/03 |
| | | | 700/4 |
| 2010/0234996 A1* | 9/2010 | Schreiber | B25J 13/085 |
| | | | 700/258 |
| 2012/0053853 A1 | 3/2012 | Tan | |
| 2019/0121359 A1 | 4/2019 | Dobberphul et al. | |
| 2019/0283768 A1 | 9/2019 | Das | |
| 2019/0343043 A1* | 11/2019 | Bormann | A01D 41/1274 |
| 2020/0290205 A1* | 9/2020 | Hammes | B25J 9/1674 |
| 2020/0351616 A1* | 11/2020 | Vanderveen | H04W 12/03 |

FOREIGN PATENT DOCUMENTS

| | | |
|---|---|---|
| DE | 10 2013 204 842 A1 | 9/2013 |
| DE | 10 2015 001 971 A1 | 8/2016 |
| EP | 3 473 512 A1 | 4/2019 |
| JP | 2020-79064 A | 5/2020 |
| JP | 2020-79065 A | 5/2020 |
| WO | WO 2019/116870 A1 | 6/2019 |

OTHER PUBLICATIONS

German-language Written Opinion (PCT/ISA/237) issued in PCT Application No. PCT/EP2021/070933 dated Nov. 11, 2021 (six (6) pages).

German-language Search Report issued in German Application No. 10 2020 120 301.2 dated Mar. 5, 2021 with partial English translation (12 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Korean-language Office Action issued in Korean Application No. 10-2023-7001310 dated May 21, 2025 with English translation (10 pages).

Japanese-language Office Action issued in Japanese Application No. 2023-505444 dated Jul. 2, 2025 with English translation (6 pages).

\* cited by examiner

DRIVING ASSISTANCE SYSTEM AND DRIVING ASSISTANCE METHOD FOR A VEHICLE INCLUDING A PLAUSIBILITY CHECK BY A CONTROL UNIT ON INFORMATION FROM ANOTHER CONTROL UNIT

TECHNICAL FIELD

The present disclosure relates to a driving assistance system for a vehicle, to a vehicle having such a driving assistance system, to a driving assistance method for a vehicle and to a storage medium for performing the driving assistance method. The present disclosure relates in particular to a gradual plausibility check on controllers for driving assistance systems in vehicles.

BACKGROUND

Driving assistance systems for automated driving are becoming steadily more important. Automated driving can take place with different levels of automation. Illustrative levels of automation are assisted, semiautomated, highly automated or fully automated driving. These levels of automation have been defined by the German Federal Highway Research Institute (BASt) (see BASt publication "Forschung kompakt", issued 11/2012). By way of example, vehicles using level 4 are on the road fully autonomously during city operation.

The driving assistance system for automated driving uses sensors that detect the surroundings on a visual basis, both in the visible and the invisible range for human beings. The sensors may be a camera, a radar and/or a LiDAR, for example. These are the main signal sources for driving assistance systems for automated driving besides high-accuracy maps.

Automated driving can involve a superordinate controller of the driving assistance system outputting an expectation, or instruction, to a subordinate controller of the driving assistance system. In the process, the subordinate controller is trusted to return only correct values, or to perform correct actions. This may not be enough for the high level of safety integrity that is demanded, however, and can moreover lead to hazardous situations in road traffic.

SUMMARY

It is an object of the present disclosure to specify a driving assistance system for a vehicle, a vehicle having such a driving assistance system, a driving assistance method for a vehicle and a storage medium for performing the driving assistance method that are able to improve the reliability of the driving assistance system. In particular, it is an object of the present disclosure to improve the safety integrity of the driving assistance system.

This object is achieved by the subject matter disclosed herein. Advantageous configurations are also specified herein.

According to various embodiments of the present disclosure, a driving assistance system for a vehicle, in particular a motor vehicle, is specified. The driving assistance system comprises a first control unit and a second control unit, the second control unit being configured to receive from the first control unit instructions for performing an action; and at least one first sensor unit associated with the first control unit, wherein the second control unit is configured to perform the action and to transmit information regarding the performance of the action to the first control unit, and wherein the first control unit is configured to check the plausibility of the information received from the second control unit on the basis of sensor data from the at least one first sensor unit.

According to the present disclosure, the first control unit uses its own sensor data to check whether or not the information provided by the second control unit about the performance of the action is plausible. By way of example, the second control unit is able to notify the first control unit that a computed radius of curvature matches a radius of curvature that is traveled on. The first control unit checks this information. If the first control unit comes to the conclusion that the information provided by the second control unit does not match the sensor data and is therefore not plausible, the first control unit can prompt suitable measures. Such a measure can be an emergency stop and/or a warning to a driver, for example. This can improve the safety integrity of the driving assistance system.

The information provided by the second control unit may be suitable for describing the performance of the action. For example, the information provided by the second control unit can indicate that the action has been performed according to instructions. Additionally or alternatively, the information provided by the second control unit can comprise data and/or values regarding the action performed that are able to be checked by the first control unit. The data and/or values regarding the action performed can indicate a specific and/or set radius of curvature for cornering, for example.

The control units are configured to control actions, components, etc., and are frequently used in vehicles. By way of example, the first control unit can be configured to ascertain a position of the vehicle on a road and to take this as a basis for actuating the second control unit. In this example, the second control unit can be configured to set a radius of curvature for cornering. To that end, the second control unit can control in particular the steering of the vehicle by way of appropriate actuators.

The first control unit and the second control unit are not limited to this example, however, and can be other control units in a vehicle that interact with one another in order to perform actions, for example as part of automated driving.

The first control unit and the second control unit can each comprise at least one processor unit. The at least one processor unit of the control unit is a programmable arithmetic and logic unit, that is to say a machine or an electronic circuit that controls other elements according to transferred commands and initiates an algorithm (process) at the same time.

The first control unit and the second control unit can be implemented in a common software and/or hardware module. Alternatively, the first control unit and the second control unit can each be implemented in separate software and/or hardware modules.

The term "plausibility check" refers to a check on data and/or information by way of the first control unit and/or the second control unit to ascertain whether or not said data and/or information are/is plausible, that is to say acceptable, reasonable and comprehensible. If the data and/or information are/is plausible, the result is a positive plausibility check. If the data and/or information are/is not plausible, however, the result is a negative plausibility check.

The first control unit is preferably superordinate to the second control unit. In this context, the term "superordinate" means that the first control unit transmits instructions to the second control unit, and in particular the instructions for performing the action. In other words, the second control unit performs what the first control unit prescribes, and provides feedback to the first control unit.

The instructions for performing an action preferably comprise setting a radius of curvature for cornering. In other words, the "action" that the second control unit performs, or is supposed to perform, is setting the radius of curvature. The present disclosure is not limited thereto, however, and the action can be any other action that is supposed to be performed, or is performed, as part of automated driving, for example.

The driving assistance system preferably comprises at least one second sensor unit associated with the second control unit. The at least one second sensor unit can be different than the at least one first sensor unit. In particular, the at least one first sensor unit and the at least one second sensor unit can comprise or be different sensor types.

The at least one first sensor unit and the at least one second sensor unit are preferably selected from the group comprising, or consisting of, at least one LiDAR system, at least one radar system, at least one camera, at least one ultrasonic system, at least one laser scanner, at least one GPS sensor and at least one inertial sensor, or acceleration sensor.

The vehicle preferably comprises a surroundings sensor system. The surroundings sensor system can comprise at least one LiDAR system and/or at least one radar system and/or at least one camera and/or at least one ultrasonic system and/or at least one laser scanner. The surroundings sensor system can provide environmental data (also referred to as "surroundings data") that reproduce an area surrounding the vehicle.

In some embodiments, the at least one first sensor unit is a sensor unit of the surroundings sensor system of the vehicle, such as for example at least one camera. Additionally or alternatively, the at least one second sensor unit can be an inertial sensor, or acceleration sensor.

The second control unit is preferably configured to check the plausibility of the performance of the action on the basis of sensor data from the at least one second sensor unit. The second control unit can further be configured to generate the information regarding the performance of the action on the basis of a result of the plausibility check carried out by the second control unit. This means that a first stage of the plausibility check can be carried out by the second control unit, and a subsequent second stage of the plausibility check can be carried out by the first control unit. It is thus possible to provide a high level of safety integrity for the driving assistance system.

The driving assistance system is preferably configured to prompt a driving maneuver, and in particular an emergency stop, if the plausibility check carried out by the first control unit is negative. The negative plausibility check in this case indicates that the information from the second control unit is not trusted and is potentially incorrect. The emergency stop can prevent the vehicle and other road users from being endangered.

The emergency stop is a driving maneuver that involves the vehicle performing an autonomous or automated emergency stop driving maneuver to stop the vehicle, for example on the shoulder, in an emergency. An autonomous emergency stop driving maneuver of this kind involves the longitudinal and transverse guidance of the vehicle taking place automatically. The driver assistance system thus undertakes vehicle guidance until the vehicle is brought to a standstill. To that end, the driver assistance system controls the drive, the gearbox, the hydraulic service brake and the steering, for example.

Additionally or alternatively, information, and in particular a warning, can be output to the driver of the vehicle if the plausibility check carried out by the first control unit is negative. The information can indicate for example that a driving function for automated driving has been shut down and the driver is meant to take control of the vehicle.

According to a further independent aspect of the present disclosure, a vehicle, in particular a motor vehicle, is specified. The vehicle comprises the driving assistance system according to the embodiments of the present disclosure.

The term vehicle covers automobiles, trucks, buses, motorhomes, motorcycles, etc., which are used to convey people, goods, etc. In particular, the term covers motor vehicles for conveying people.

The driving assistance system is preferably configured for automated driving of the vehicle.

Within the context of the document, the term "automated driving" can be understood to mean driving with automated longitudinal or transverse guidance or autonomous driving with automated longitudinal and transverse guidance. Automated driving can be for example driving over an extended period of time on the freeway or driving over a limited period of time when parking or maneuvering. The term "automated driving" covers automated driving with any level of automation. Illustrative levels of automation are assisted, semiautomated, highly automated or fully automated driving. These levels of automation have been defined by the German Federal Highway Research Institute (BASt) (see BASt publication "Forschung kompakt", issued 11/2012).

In the case of assisted driving, the driver performs the longitudinal or transverse guidance on an ongoing basis, while the system undertakes the respective other function within certain boundaries. In the case of semiautomated driving (TAF), the system undertakes the longitudinal and transverse guidance for a certain period of time and/or in specific situations, the driver needing to monitor the system on an ongoing basis as in the case of assisted driving. In the case of highly automated driving (HAF), the system undertakes the longitudinal and transverse guidance for a certain period of time without the driver needing to monitor the system on an ongoing basis; however, the driver must be capable of taking over vehicle guidance within a certain time. In the case of fully automated driving (VAF), the system can automatically cope with driving in all situations for a specific application; a driver is no longer needed for this application.

The aforementioned four levels of automation correspond to SAE levels 1 to 4 of SAE standard J3016 (SAE—Society of Automotive Engineering). By way of example, highly automated driving (HAF) corresponds to level 3 of SAE standard J3016. Furthermore, SAE standard J3016 also has provision for SAE level 5 as the highest level of automation, which is not included in the definition from the BASt. SAE level 5 corresponds to driverless driving, in which the system can automatically cope with all situations throughout the journey in the same way as a human driver; a driver is generally no longer needed.

According to a further embodiment of the present disclosure, a driving assistance method for a vehicle, in particular a motor vehicle, is specified. The driving assistance method comprises transmitting, by way of a first control unit, instructions for performing an action to a second control unit; performing the action by way of the second control unit; transmitting, by way of the second control unit, information regarding the performance of the action to the first control unit; and checking, by way of the first control unit, the plausibility of the received information on the basis of sensor data from at least one first sensor unit associated with the first control unit.

The driving assistance method can implement the aspects of the driving assistance system described in this document.

According to a further independent aspect of the present disclosure, a software (SW) program is specified. The SW program can be configured to be executed on one or more processors and to thereby perform the driving assistance method described in this document.

According to a further independent aspect of the present disclosure, a storage medium is specified. The storage medium can comprise an SW program configured to be executed on one or more processors and to thereby perform the driving assistance method for a vehicle as described in this document.

According to a further independent aspect of the present disclosure, software containing program code for carrying out the driving assistance method when the software runs on one or more software-controlled devices is specified.

Exemplary embodiments of the disclosure are shown in the figures and are described more specifically below.

DETAILED DESCRIPTION

In the text that follows, the same reference signs are used for elements that are the same and that have the same effect, unless stated otherwise.

Figure 1:
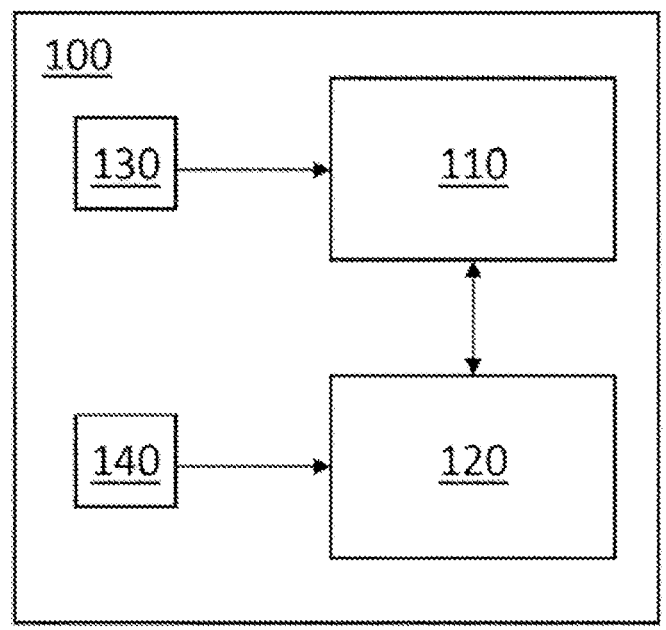
FIG. 1 schematically shows a driving assistance system for a vehicle according to embodiments of the present disclosure, FIG. 2 schematically shows a vehicle having a driving assistance system for automated driving according to embodiments of the present disclosure.

FIG. 1 schematically shows a driving assistance system 100 for a vehicle according to embodiments of the present disclosure.

The driving assistance system 100 comprises a first control unit 110 and a second control unit 120, the second control unit 120 being configured to receive from the first control unit 110 instructions for performing an action; and at least one first sensor unit 130 associated with the first control unit 110, wherein the second control unit 120 is configured to perform the action and to transmit information regarding the performance of the action to the first control unit 110, and wherein the first control unit 110 is configured to check the plausibility of the information received from the second control unit 120 on the basis of sensor data from the at least one first sensor unit 130.

In some embodiments, the driving assistance system 100 comprises at least one second sensor unit 140 associated with the second control unit 120. The at least one second sensor unit 140 can be different than the at least one first sensor unit 130. In particular, the at least one first sensor unit 130 and the at least one second sensor unit 140 can comprise or be different sensor types.

By way of example, the at least one first sensor unit 130 is a sensor unit of the surroundings sensor system of the vehicle 10, such as for example a camera. Additionally or alternatively, the at least one second sensor unit 140 can be an inertial sensor, or acceleration sensor.

The first control unit 110 and the second control unit 120 are typically connected to one another by a bidirectional communication connection. The first control unit 110 and the second control unit 120 can use the bidirectional communication connection to interchange data, in particular regarding the instructions for performing an action and the information regarding the performance of the action. The bidirectional communication connection can be a wired communication connection or a wireless communication connection.

The driving assistance system 100 according to the present disclosure thus comprises at least two control units (also referred to as "controllers"), one control unit being superordinate to the other control unit, and a gradual plausibility check being carried out.

In particular, the superordinate control unit calls for specific activities from the subordinate control unit. The subordinate control unit then indicates whether the control unit is of the view that no errors have occurred during ascertainment/performance of the action(s). This can be a first stage of the plausibility check carried out by the subordinate control unit.

When the superordinate control unit receives the applicable information from the subordinate control unit, a fresh plausibility check is carried out by the superordinate control unit. Only if both control units obtain a positive outcome for the plausibility check on the process is the process (e.g. automated driving) also carried out, or continued.

Should the superordinate control unit fail to obtain a positive outcome for the plausibility check, however, then the subordinate control unit is not trusted and the process (e.g. automated driving) is terminated according to previously defined safety mechanisms. In particular, an emergency stop for the vehicle can be carried out. Alternatively, control of the vehicle can be transferred from the driving assistance system back to the driver.

The plausibility check is advantageously carried out on the basis of different sensor systems. By way of example, the subordinate control unit can use an inertial sensor system for plausibility checks, and the superordinate control unit can use an optical sensor system for plausibility checks.

An illustrative detailed implementation of the general principle explained above is described below.

For driver assistance systems having two or more interacting control units, the highest-level control unit may be the one that knows and/or is able to ascertain the absolute position of the vehicle on the road. The superordinate control unit calls for the subordinate control unit to set a curvature, in order for example to take a bend.

The subordinate control unit then checks, for example by means of inertial sensors, whether the computed radius of curvature matches the radius of curvature that is actually traveled on.

The superordinate control unit subsequently checks, for example by means of optical sensors, on the basis of the absolute position, whether the radius of curvature set by the subordinate control unit matches the radius of curvature that is actually traveled on.

If the radii of curvature do not match, automated driving can be terminated. This termination can comprise or be for example an emergency stop for the vehicle, a warning to the driver, transfer of vehicle control to the driver, etc.

Figure 2:
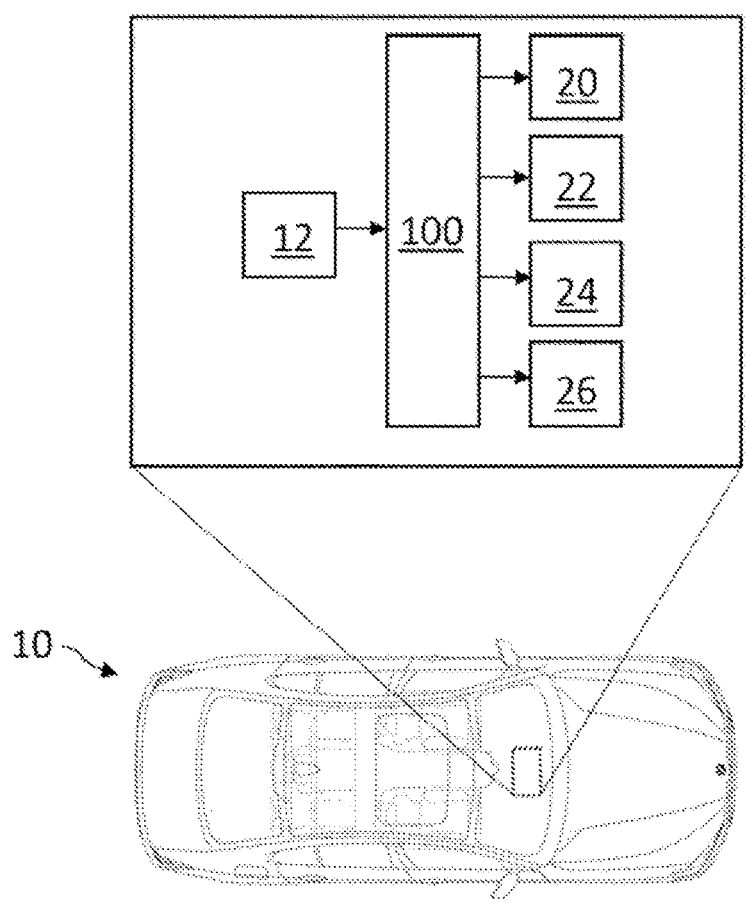

FIG. 2 schematically shows a vehicle 10 having a driving assistance system 100 for automated driving according to embodiments of the present disclosure.

The vehicle 10 comprises the driving assistance system 100 for automated driving. The automated driving involves longitudinal and/or transverse guidance of the vehicle taking place automatically. The driving assistance system 100 thus undertakes vehicle guidance. To that end, the driving assistance system 100 controls the drive 20, the gearbox 22, the (for example hydraulic) service brake 24 and the steering 26 by way of intermediate units of the vehicle 10 (which are not shown in FIG. 2).

To plan and carry out automated driving, the driver assistance system 100 receives environmental information from an environment sensor system that observes the vehicle environment. In particular, the vehicle can comprise at least one surroundings sensor 12 configured to accept surroundings data indicating the vehicle environment. The at least one surroundings sensor 12 can comprise one or more LiDAR systems, one or more radar systems, one or more laser scanners and/or one or more cameras, for example.

Figure 3:
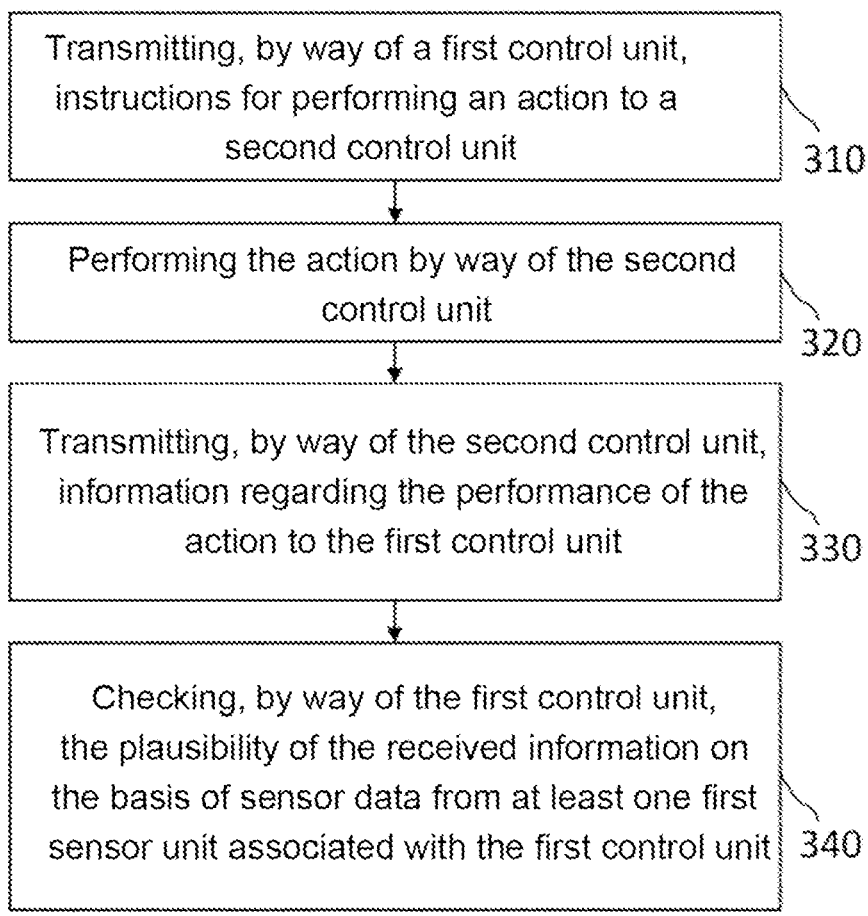
FIG. 3 shows a flowchart for a driving assistance method for a vehicle according to embodiments of the present disclosure.

FIG. 3 schematically shows a flowchart for a driving assistance method 300 for a vehicle, in particular a motor vehicle, according to embodiments of the present disclosure.

The driving assistance method 300 can be implemented by appropriate software that can be executed by one or more processors (e.g. a CPU).

The driving assistance method 300 comprises transmitting, by way of a first control unit, instructions for performing an action to a second control unit in block 310; performing the action by way of the second control unit in block 320; transmitting, by way of the second control unit, information regarding the performance of the action to the first control unit in block 330; and checking, by way of the first control unit, the plausibility of the received information on the basis of sensor data from at least one first sensor unit associated with the first control unit in block 340.

According to the present disclosure, the first control unit uses its own sensor data to check whether or not the information provided by the second control unit about the performance of the action is plausible. By way of example, the second control unit is able to notify the first control unit that a computed radius of curvature matches a radius of curvature that is traveled on. The first control unit checks this information. If the first control unit comes to the conclusion that the information provided by the second control unit does not match the sensor data and is therefore not plausible, the first control unit can prompt suitable measures. Such a measure can be an emergency stop and/or a warning to a driver, for example. This can improve the safety integrity of the driving assistance system.

Although the invention has been illustrated and explained more specifically in detail by way of preferred exemplary embodiments, the invention is not restricted by the disclosed examples and other variations can be derived therefrom by a person skilled in the art without departing from the scope of protection of the invention. It is clear, therefore, that a multiplicity of possible variations exist. It is also clear that embodiments mentioned by way of illustration are really only examples which should not be considered in any way as limiting the scope of protection, the possible applications or the configuration of the invention, for example. Instead, the preceding description and the description of the figures enable a person skilled in the art to implement the illustrative embodiments in concrete form, with a person skilled in the art, knowing the disclosed concept of the invention, being able to make various changes, for example with regard to the operation or the arrangement of individual elements mentioned in an illustrative embodiment, without departing from the scope of protection defined by the claims and the legal equivalents thereof, such as, for instance, further explanations in the description.

The invention claimed is:

1. A driving assistance system for a vehicle, comprising:
    a first control unit and a second control unit, wherein the second control unit is configured to receive from the first control unit instructions for performing an action; and
    at least one first sensor unit associated with the first control unit,
    wherein the second control unit is configured to perform the action and to transmit information regarding performance of the action to the first control unit, and
    wherein the first control unit is configured to check a plausibility of the information received from the second control unit on a basis of sensor data from the at least one first sensor unit.

2. The driving assistance system according to claim 1, wherein the first control unit is superordinate to the second control unit.

3. The driving assistance system according to claim 1, further comprising:
    at least one second sensor unit associated with the second control unit, wherein the at least one second sensor unit is different from the at least one first sensor unit.

4. The driving assistance system according to claim 3, wherein the second control unit is configured to:
    check a plausibility of a performance of the action on a basis of sensor data from the at least one second sensor unit; and
    generate the information regarding the performance of the action on a basis of a result of the plausibility check carried out by the second control unit.

5. The driving assistance system according to claim 1, wherein the driving assistance system is configured to prompt a driving maneuver in response to the plausibility check carried out by the first control unit being negative.

6. The driving assistance system according to claim 5, wherein the driving maneuver comprises an emergency stop.

7. The driving assistance system according to claim 1, wherein the instructions for performing the action relate to adjustment of a radius of curvature for cornering.

8. The driving assistance system according to claim 1, wherein the driving assistance system is configured for automated driving.

9. A motor vehicle comprising the driving assistance system according to claim 1.

10. A driving assistance method for a vehicle, comprising:
    transmitting, by a first control unit, instructions for performing an action to a second control unit;
    performing the action by the second control unit;
    transmitting, by the second control unit, information regarding a performance of the action to the first control unit; and
    checking, by the first control unit, a plausibility of the information received from the second control unit on a basis of sensor data from at least one first sensor unit associated with the first control unit.

11. The driving assistance method according to claim 10, wherein the first control unit is superordinate to the second control unit.

12. The driving assistance method according to claim 10, further comprising:
    checking, by the second control unit, a plausibility of a performance of the action on a basis of sensor data from at least one second sensor unit associated with the second control unit, wherein the at least one second sensor unit is different from the at least one first sensor unit; and generating, by the second control unit, the information regarding the performance of the action on a basis of a result of the plausibility check carried out by the second control unit.

13. The driving assistance method according to claim 10, further comprising:
prompting a driving maneuver in response to the plausibility check carried out by the first control unit being negative.

14. The driving assistance method according to claim 13, wherein prompting the driving maneuver further comprises prompting an emergency stop.

15. The driving assistance method according to claim 10, wherein the instructions for performing the action relate to adjustment of a radius of curvature for cornering.

16. The driving assistance method according to claim 10, further comprising performing automated driving.

17. A non-transitory storage medium having stored thereon a software program that, when executed by one or more processors, cause the one or more processors to perform the driving assistance method according to claim 10.

* * * * *